Oct. 9, 1951        R. SUNDBERG        2,570,285
SEINE PURSING DEVICE
Filed April 12, 1948        3 Sheets-Sheet 1
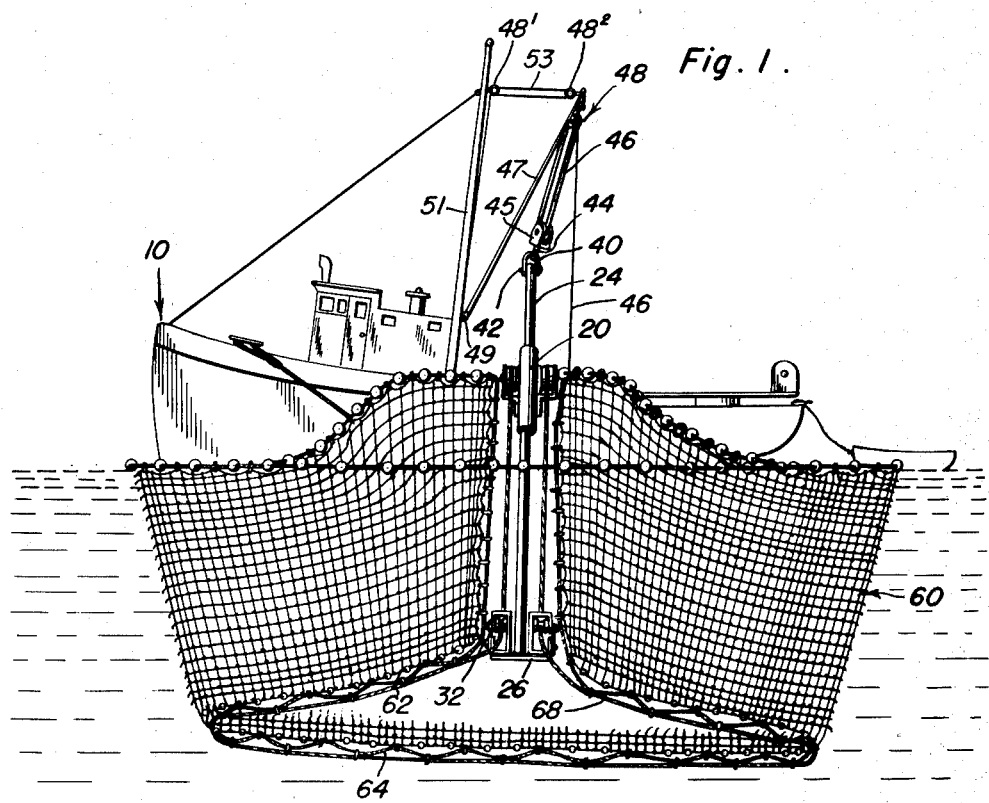
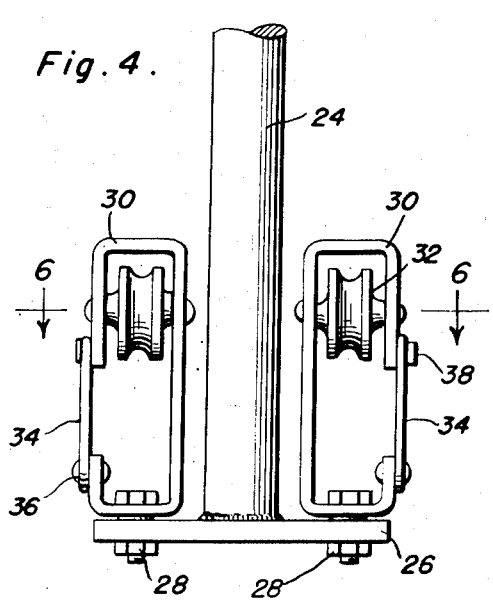
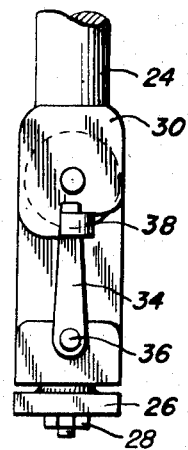
Rudolph Sundberg
INVENTOR.

Oct. 9, 1951     R. SUNDBERG     2,570,285
SEINE PURSING DEVICE
Filed April 12, 1948     3 Sheets-Sheet 2
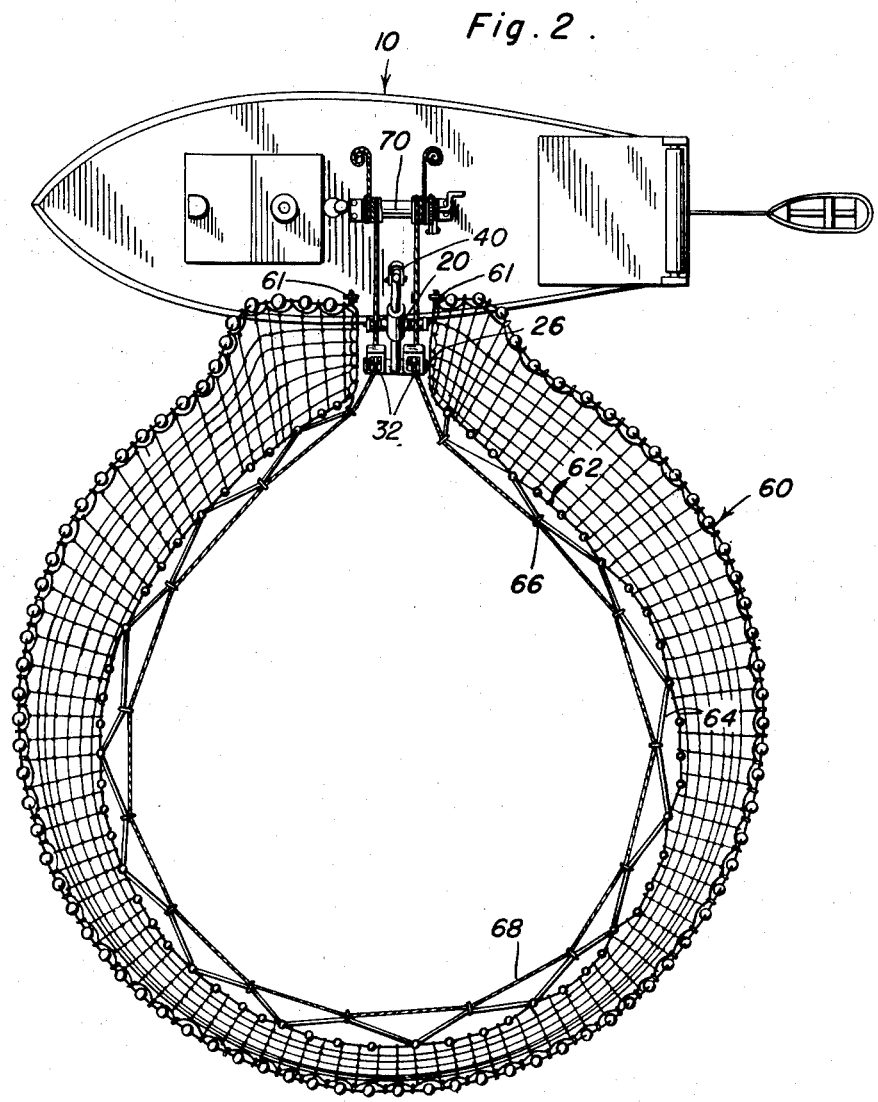
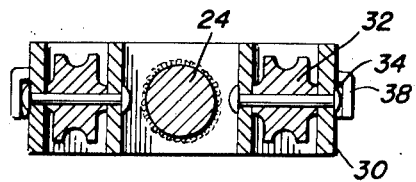
Rudolph Sundberg
INVENTOR.

Oct. 9, 1951  R. SUNDBERG  2,570,285
SEINE PURSING DEVICE
Filed April 12, 1948  3 Sheets-Sheet 3
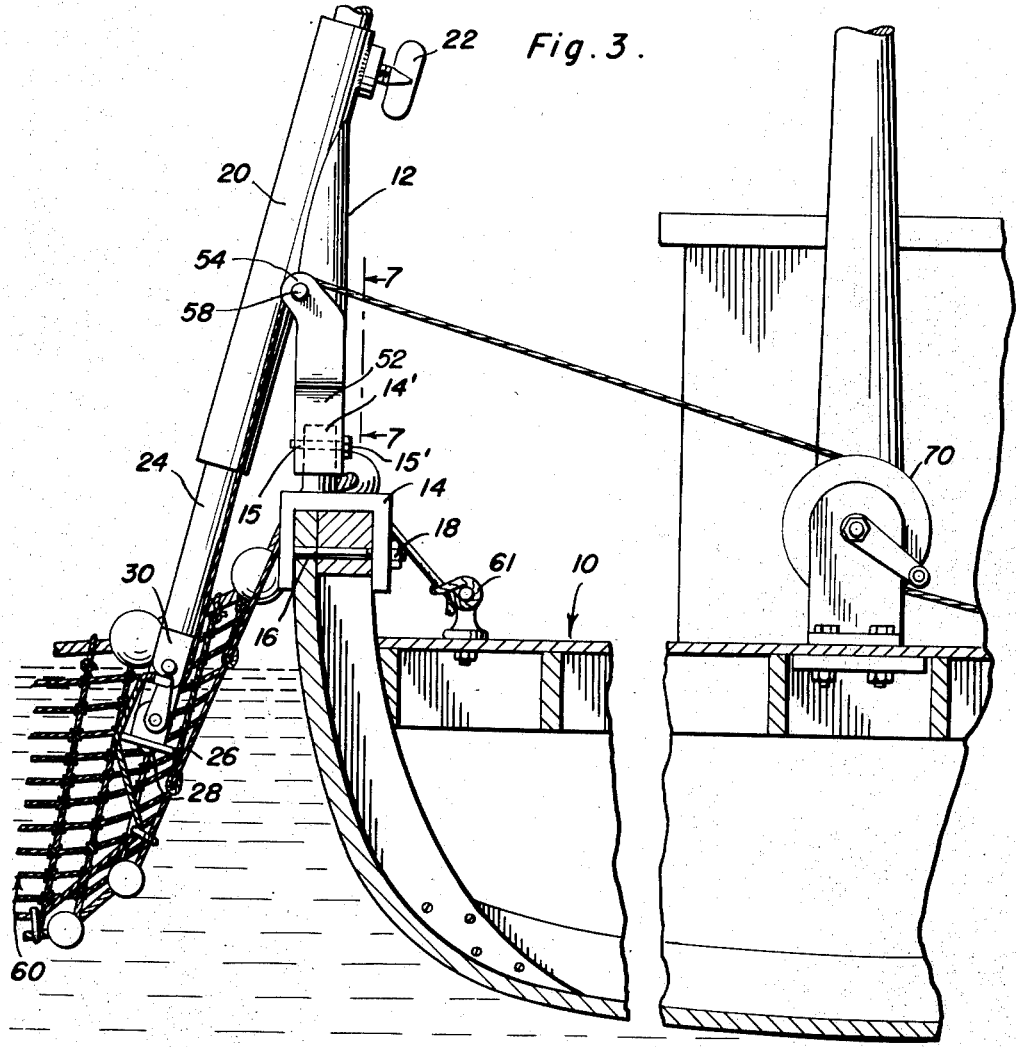
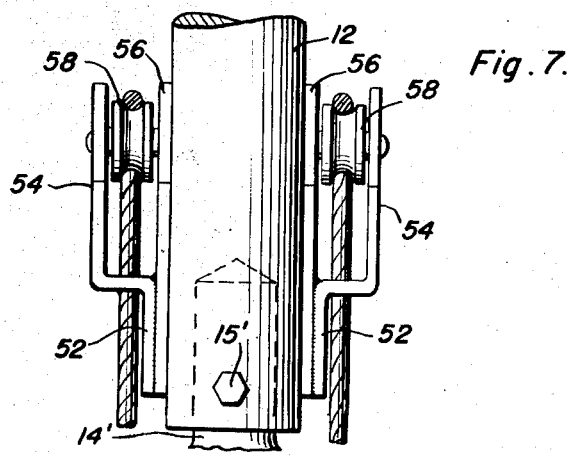
Rudolph Sundberg
INVENTOR.

Patented Oct. 9, 1951

2,570,285

UNITED STATES PATENT OFFICE 2,570,285

SEINE PURSING DEVICE

Rudolph Sundberg, Seward, Territory of Alaska

Application April 12, 1948, Serial No. 20,570

4 Claims. (Cl. 43—8)

This invention relates to a seine pursing device and has for its primary object the provision of means whereby the purse and lead lines may be kept below the fishing vehicle as far as possible and whereby pursing may be safely accomplished. By the conventional fishing methods, many fish are lost during the pursing operation since the purse and lead lines generally raise up and the fish go out from under the boat. In order to keep the fish in the seine, the fisherman was required to stand at the side of the vessel and plunge said seine with a plunger. The device of the instant invention does away with this crude and inefficient method of fishing.

The instant invention is utilized both in boats of deep and shallow-water fishing.

Yet another object of this invention is to provide means for supporting the seine in deep water as close to the bottom of the boat as possible. Fishing in such a manner permits for the retention of the fish in the seine with a greater degree of safety than heretofore encountered by the use of conventional seine devices.

A further object of this invention is to provide pulley means and a flexible line such as manila or cotton rope, engageable therewith which is attached to a winch normally found on a boat and with the purse of the seine for readily and easily closing the bottom portion of the seine when it is lowered to the desired depth in the water.

Thus it will be seen that the main purpose of this invention is to provide means for adjustably lowering and raising the seine into the water at a desired angle relative to the boat and to provide means for readily closing the bottom portion of the seine when desired. This makes for efficient and safe fishing in both shallow and deep water.

These, together with various ancillary objects and features of the invention which will later become apparent as the following description proceeds, are attained by the device, the preferred embodiments of which are illustrated by way of example only, in the accompanying drawings, wherein:

Figure 1 is a front elevational view of the device of the instant invention in total assembly with the boat and the seine;

Figure 2 is a top plan view of the device of the instant invention in total assembly with the seine and the boat, the raising and lowering means being omitted;

Figure 3 is a partial longitudinal vertical sectional view of the device, some parts being shown in elevation and other parts broken away;

Figure 4 is a front elevational view of the snatch block or pulley guide members and the seine supporting plates attached thereto;

Figure 5 is a side elevational view of the snatch block or guide members looking to the right of Figure 4;

Figure 6 is a horizontal sectional view of the snatch block taken substantially on the plane of the section line 6—6 of Figure 4; and Figure 7 is a fragmentary side elevational view taken substantially on the plane of section line 7—7 of Figure 3.

Specific reference is now made to the drawings. In the several views in the accompanying drawings and in the following specification similar reference characters indicate corresponding elements throughout.

Generally indicated at 10 is a fishing vessel to which is removably secured a vertical or upright support 12, in the form of a hollow cylinder. Journaled in the support 12 is an upstanding lug 14' which is suitably secured therein by means of a screw 15 and nut 15'. The lug 14' is integral with an inverted U-shaped cover clamp 14 having apertures in the sides thereof for engageably receiving a bolt or screw 16 and a nut 18.

Welded to the top portion of upright support 12 and inclined at a right angle downwardly and outwardly relative to the vessel is a hollow, cylindrical guide member or sleeve 20 provided with a conventional set screw 22 at the top thereof.

Slidably journalled in said guide member 20 is a seine-supporting pipe or rod 24 to the bottom extremity of which is welded a seine-engaging plate 26. Adjacent the side of the seine-supporting rod 24 and removably secured to support plate 26 by means of screws or bolts 28 a pair of snatch blocks 30 are provided consisting of C-shaped frames as shown in Figure 4. Journalled in these frames 30 substantially at the top thereof guide members or pulleys 32 are provided. Carried by the side of the C-shaped frames 30 and across the opening in said frames, latch means are provided consisting of a plate 34 pivotally secured to the bottom of the frame as at 36, which plate is engageably received by a suitable keeper 38 secured to the top portion of the frame 30.

To the top extremity of seine-supporting bar 24 a U-bolt 40 is removably secured by means of a pin 42. Engaging the U-bolt is a eye piece or hook 44 carried by a double sheave or pulley 45. Another pulley 48 is provided similar to pulley 45 and a wire or cable 46 is secured to the upper pulley 48 and entrained over both pulleys 45 and 48. Said flexible wire or cable 46 has a free end which is attached to a cable drum or winch (not shown) on the vessel. Thus by operating the winch or cable drum, seine-supporting bar 24 can be readily raised or lowered in the guide 20 and fixed at any desired position by means of set screw 22. The upper pulley 48 is secured to the upper end of a boom 47 which is pivoted as at 49 to a mast 51. The boom is operated by a suitable cable 53 entrained over pulleys 48$^1$ and 48$^2$ respectively, secured to the mast and boom 47, it being understood that the cable 53 is secured to a suitable winch (not shown). The structural features described in the paragraph herein and comprising the raising and lowering means is conventionally known in the art as a rigging.

Fixedly secured as by welding to the upright member 12, a pair of plates 52 are provided having outwardly disposed top portions 54. Between the upright member 12 and the plates 52 a plate 56 is suitably positioned and fixedly secured to the upright member and the plates 52 as by welding. Between the angulated portion 54 and the plate 56 suitable guides or pulleys 58 are journalled.

Generally indicated at 60 is a netting or seine which is suitably mounted at its free ends to the sides of the vessel by retaining means 61, and which has an opening at the lower portion thereof. Around the periphery of this lower portion is a lead line 62 to which is suitably secured a strap 64 provided with a plurality of rings 66 therethrough. Also through these rings 66 a flexible wire, cable, or purse line is provided at 68, the free ends of which engage the pulleys 32 and the pulleys 58, and are secured to a cable drum or winch 70. Thus by operating the cable drum or winch, or by manual pulling, the purse line 68 will be actuated to close the seine at the bottom portion thereof.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A seine pursing device comprising an upright, means removably securing said upright to the side of a boat, an inclined guide rigidly carried by said upright, a seine supporting member slidably and adjustably mounted in said guide, a seine having an open lower portion therein, a plurality of spaced guide rings carried by the open lower portion of said seine, a purse line slidably engaging said guide rings, guide means carried by said seine supporting member, further guide means carried by said upright, and a rotary cable drum carried by the boat, said purse line being secured to said cable drum and engageable with said second-mentioned guide means and said further guide means for closing said seine said first-mentioned guide being secured to said upright at an angle so that the seine will be maintained relatively close to the boat throughout the entire movement of said supporting member and said guide.

2. The combination of claim 1 and means for raising and lowering said seine supporting member.

3. The combination of claim 2 wherein said raising and lowering means is a rigging.

4. A seine pursing device comprising an upright removably secured to the side of a boat, a tubular guide secured to said upright, a seine supporting rod slidable in said guide, means for raising and lowering said rod, means for retaining said rod in a fixed adjusted position in said guide, a seine having an open lower portion therein, a plate carried by said rod, spaced guide rollers carried by said plate on both sides of said rod, spaced pulleys secured to said upright, guide rings carried by the open lower portions of said seine, a purse line slidable in said rings and entrained over said guide rollers and pulleys, and a rotary cable drum on the boat receiving the ends of said purse line for closing said seine, said guide being secured to said upright at an angle so that the seine will be maintained relatively close to the boat throughout the entire movement of said rod in said guide.

RUDOLPH SUNDBERG.

REFERENCES CITED

The following references are of record in the file of this patent:

UNITED STATES PATENTS

| Number | Name | Date |
| --- | --- | --- |
| 672,571 | Savoy | Apr. 23, 1901 |
| 876,148 | Cloud | Jan. 7, 1908 |
| 977,835 | Piscator | Dec. 6, 1910 |
| 1,214,125 | Bergman | Jan. 30, 1917 |
| 1,413,552 | Yancey | Apr. 18, 1922 |